US010488712B2

(12) United States Patent
Tezuka et al.

(10) Patent No.: US 10,488,712 B2
(45) Date of Patent: Nov. 26, 2019

(54) LIQUID CRYSTAL DISPLAY APPARATUS

(71) Applicant: Sakai Display Products Corporation, Osaka (JP)

(72) Inventors: Tatsuya Tezuka, Osaka (JP); Taiki Hayai, Osaka (JP); Kenichi Mukai, Osaka (JP); Naoki Kotani, Osaka (JP); Kazunori Yamamoto, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 15/878,850

(22) Filed: Jan. 24, 2018

(65) Prior Publication Data

US 2018/0149892 A1 May 31, 2018

Related U.S. Application Data

(63) Continuation-in-part of application No. PCT/JP2015/071546, filed on Jul. 29, 2015.

(51) Int. Cl.
*G02F 1/1339* (2006.01)
*G02F 1/1333* (2006.01)
*G02F 1/1337* (2006.01)

(52) U.S. Cl.
CPC ...... *G02F 1/1339* (2013.01); *G02F 1/133345* (2013.01); *G02F 1/133723* (2013.01)

(58) Field of Classification Search
CPC .................................................. G02F 1/1339
See application file for complete search history.

(56) References Cited

U.S. PATENT DOCUMENTS

2002/0163611 A1* 11/2002 Kamijima ............. G02F 1/1339
349/122
2006/0012735 A1* 1/2006 Yamada ................ G02F 1/1339
349/110

(Continued)

FOREIGN PATENT DOCUMENTS

JP 2007-322474 * 12/2007 .......... G02F 1/1343
JP 2007322474 A 12/2007

(Continued)

OTHER PUBLICATIONS

English Translation of the International Search Report, PCT International Application No. PCT/JP2015/071546, Japan Patent Office, Tokyo, Japan. dated Oct. 6, 2015.

*Primary Examiner* — Sang V Nguyen
(74) *Attorney, Agent, or Firm* — Marsh Fischmann & Breyfogle LLP

(57) ABSTRACT

Provided is a liquid crystal display apparatus such that a liquid material for an alignment film can be prevented from entering a region for forming a sealing member so that the peeling of the sealing member caused by the deterioration of adhesion between the sealing member and a substrate can be prevented and a narrow frame can be attained. A display panel includes a rectangular-shaped TFT substrate and CF substrate bonded together with a sealing member formed at a periphery thereof, a liquid crystal layer provided at a region surrounded by the sealing member between the two substrates to form a display region, and an groove and protrusion part provided between the display region and the sealing member having a groove formed along a circumferential direction in a region between the display region and the sealing member, the groove and protrusion part having wave-like shape in a plan view.

15 Claims, 11 Drawing Sheets

(56) References Cited

U.S. PATENT DOCUMENTS

| | | | | |
|---|---|---|---|---|
| 2009/0279039 A1* | 11/2009 | Kotani | ............... | G02F 1/133711 |
| | | | | 349/153 |
| 2010/0025692 A1* | 2/2010 | Hsiao | ................ | H01L 29/42384 |
| | | | | 257/72 |
| 2012/0320324 A1* | 12/2012 | Doi | ..................... | G02F 1/13338 |
| | | | | 349/138 |
| 2013/0077035 A1* | 3/2013 | Kanzaki | ................ | H01L 33/005 |
| | | | | 349/123 |
| 2015/0219944 A1* | 8/2015 | Mitsumoto | ........... | G02F 1/1339 |
| | | | | 349/138 |

FOREIGN PATENT DOCUMENTS

| | | | |
|---|---|---|---|
| WO | 2011155133 A1 | 12/2011 | |
| WO | 2014024783 A1 | 2/2014 | |

* cited by examiner

LIQUID CRYSTAL DISPLAY APPARATUS

CROSS-REFERENCE TO RELATED APPLICATION

This is a continuation-in-part of PCT international application No. PCT/JP2015/071546 filed on Jul. 29, 2015, incorporated herein by reference.

FIELD OF THE INVENTION

The present invention relates to a liquid crystal display apparatus with a TFT (thin film transistor) substrate provided in, for example, a television receiver, a personal computer.

BACKGROUND OF THE INVENTION

Within the field of display apparatus, liquid crystal display apparatus can have characteristics of thin profile and low power consumption. A liquid crystal display apparatus provided with a TFT (active-matrix) substrate having a switching element such as TFT at each pixel, especially has a high contrast ratio and excellent response characteristics and exhibits high performance. Therefore, it is suitably used for, for example, a television receiver, a personal computer.

A television receiver (hereinafter, referred to as a TV receiver) provided with a liquid crystal display apparatus includes, for example, a display panel having a surface to display an image in front of it, a display module having a backlight unit to irradiate a rear surface of the display panel with light, a front cabinet covering the periphery and side of a front surface of the display module, and a rear cabinet covering the rear surface of the display module.

The display panel includes a TFT substrate and an opposite substrate (a color filter substrate, a CF substrate) facing each other, a liquid crystal layer provided between the TFT substrate and the CF substrate as a display medium layer, a frame-shape sealing member for bonding the TFT substrate and the CF substrate together and sealing the liquid crystal layer into a space between the TFT substrate and the CF substrate.

A plurality of gate wirings (scanning wirings) and a plurality of source wirings (signal wirings) each crossing the respective gate wirings are provided on an insulation substrate of the TFT substrate. An area surrounded by two neighboring gate wirings and two neighboring signal wirings constitutes a pixel area, and, a TFT, and a pixel electrode made of, for example, ITO (Indium-Tin-Oxide) film are arranged in each of the corresponding pixel areas. The pixel electrode is covered by an alignment film.

The alignment film is made of a material such as polyimide and formed so as to cover a display region which includes the plurality of pixel areas, for example, using an inkjet method. Since the material for the alignment film, such as polyimide, has a low viscosity, the resulting alignment film often wettingly spreads to the edge of the substrate from the display region when the material is applied to the display region using inkjet method. If the alignment film spreads to a sealing member forming region, it may cause deterioration of adhesion between the sealing member and the substrate, resulting the peeling of the sealing member.

JP 2007-322494 A (hereinafter, referred to as Patent Document 1) discloses an invention of a liquid crystal display apparatus configured to include an insulation film, to which a step part is provided, between a display region and a sealing member forming region on a TFT substrate, such that grooves and protrusions are provided on a conductive film when the conductive film covers the step part.

FIG. 12 is a schematic plan view of a groove and protrusion part 27 of a display panel of the liquid crystal display apparatus of Patent Document 1, and FIG. 13 is a cross-sectional view along the line XIII-XIII of FIG. 12. A portion of the groove and protrusion part 27, which is corresponds to a part of the upper side of the display panel is shown in FIG. 12 and FIG. 13. The upper side of FIG. 12 corresponds to the sealing member forming region S on which the sealing member 4, described in the following paragraphs, will be formed, and the lower side corresponds to a display region D. A cover metal 25 and a conductive film 26 are omitted in FIG. 12.

As mentioned above, the TFT substrate 2 and the CF substrate 3 are bonded by a frame-shape sealing member 4 that is provided on the periphery of the CF substrate 3. The groove and protrusion part 27 is provided between the display region D and the sealing member forming region S.

As shown in FIG. 12, the signal wirings 22 on the TFT substrate 2 are disposed to extend at a predetermined angle to the row direction at the inner side of the sealing member forming region S (the area closer to the display region D). The signal wiring 22 are disposed to cross across the groove and protrusion part 27, extend at a predetermined angle to the row direction at the outer side of the display region D (the area closer to the sealing member forming region S), and then extend in the column direction in the display region D (not shown).

A second interlayer insulation film 24 in the groove and protrusion part 27 includes three grooves 249 each extending in the row direction and positioned side by side in the column direction.

As shown in FIG. 12 and FIG. 13, the signal wirings 22 are formed on, for example, the insulation substrate 21 such as a glass substrate of the TFT substrate 2, and a first interlayer insulation film 23 is formed on the signal wirings 22.

A cover metal 25 is formed at a portion corresponding to the groove and protrusion part 27 on the first interlayer insulation film 23 and above the signal wirings 22.

The second interlayer insulation film 24 which is formed by an organic insulation film such as photosensitive acrylic resin is provided in such a way to cover the first interlayer insulation film 23 and the cover metal 25, and a groove 249 is formed by patterning.

Further, a conductive film 26 made of ITO (Indium-Tin-Oxide) is formed by vapor deposition in such a way to cover the second interlayer insulation film 24. On the conductive film 26, a groove 269 is formed at a position corresponding to the groove 249.

In this liquid crystal display apparatus, a wet-spreading of the polyimide can be blocked by the level difference in the groove and protrusion part 27 when an alignment film 6 made of polyimide is formed on the conductive film 26 at a position corresponding to the display region D, and further, it is expected that the wet-spreading of the alignment film 6 will be further prevented due to a low wettability of polyimide to ITO.

SUMMARY OF THE INVENTION

Problems to be Solved by the Invention

In the display panel of the above-mentioned Patent Document 1, the liquid material for the alignment film 6, such as polyimide, has large surface tension and the conductive film 26 has small surface tension, making the contact angle between them large at an edge of the groove 269 of the conductive film 26, and therefore, it is expected that the wet-spreading of the alignment film 6 is suppressed. However, this display panel had a problem, caused by the insufficient length of the edge of the groove 269, that the effect of suppressing the wet-spreading of the alignment film 6 is limited.

In particular, when a size of an outer shape of the display panel is made to be smaller while a size of the display region D has remained the same, or, in other words, when attaining a narrow frame, the groove and protrusion part 27 will be formed close to the display region D and the width of which will become narrower, resulting an insufficient suppressing of the wet-spreading of the alignment film 6 and a problem that the alignment film 6 will more likely enter the sealing member forming region S.

Also, Patent Document 1 describes that, if the peeling is occurred at the groove and protrusion part of the second interlayer insulation film 24, the whole part could come off, and therefore, it is preferable to provide a cut portion at the groove and protrusion part or specifically, to provide a cut portion at the groove 249. However, in this configuration, the cut portion is generated at the groove and protrusion part of the conductive film 26, and the material for an alignment film may be apt to flow toward the sealing member forming region S starting from the cut portion.

The present invention is made in consideration of such a situation, and it aims to provide a liquid crystal display apparatus wherein an entering of a liquid material for an alignment film into a sealing member forming region is prevented, a peeling of a sealing member caused by the deterioration of adhesion between the sealing member and a substrate is suppressed, and enabling to attain a narrow frame.

Means to Solve the Problem

A liquid crystal display apparatus according to one embodiment of the present invention includes two rectangular-shaped substrates bonded together with a sealing member formed at a periphery thereof, a liquid crystal layer provided at a region surrounded by the sealing member between the two substrates to form a display region, an alignment film provided at the display region on a surface of one substrate of the two substrates, the surface opposing to the other substrate of the two substrates, and a groove and protrusion part provided between the display region and the sealing member having a groove formed along a circumferential direction in a region between the display region and the sealing member, the groove and protrusion part having wave-like shape in a plan view.

In this embodiment of the present invention, the groove and protrusion part has a wave-like shape in a plan view, enabling to increase a linear length of the line along the groove (a length of a side surface of the groove) and a surface area of the grooves of the groove and protrusion part. This can increase the surface tension of the liquid material for the alignment film at the groove and protrusion part, suppress the wet-spreading of the liquid material, and prevent the entering of the alignment film into the sealing member forming region.

Therefore, the peeling of the sealing member caused by the deterioration of adhesion between the sealing member and a substrate can be suppressed.

Furthermore, even when a size of an outer shape of the display panel is made to be smaller or when the groove and protrusion part and the sealing member forming region are formed close to a periphery of the display region and the width of the groove and protrusion part becomes narrower, the wet-spreading of the liquid material for the alignment film is suppressed, enabling to attain a narrow frame of the display panel excellently.

Further, the groove and protrusion part does not include a cut portion described in Patent Document 1, and therefore, the alignment film does not spread to the sealing member forming region from the cut portion.

In another embodiment of the liquid crystal display apparatus according to the present invention, it is preferred that the wave-like shape in a plan view of the groove and protrusion part is a square wave shape.

In this configuration, since the groove and protrusion part has right-angled bent portions, the wet-spreading of the liquid material for the alignment film is further suppressed than in the case with obtuse bent portions.

In yet another embodiment of the liquid crystal display apparatus according to the present invention, it is preferred that the wave-like shape in a plan view of the groove and protrusion part is a sine wave shape or trapezoidal wave shape.

In this configuration, an interference with other members is less likely to occur.

In yet another embodiment of the liquid crystal display apparatus according to the present invention, it is preferred that the groove and protrusion part formed along the sealing member has a plurality of the grooves in a direction crossing the circumferential direction.

In this configuration, the wet-spreading of the liquid material for the alignment film is further suppressed.

In yet another embodiment, it may be that a sealing member-side groove provided close to the sealing member and a display region-side groove provided close to the display region adjacent to each other in the direction crossing the circumferential direction are arranged such that a length in a circumferential direction of a projection part projected toward the sealing member of the sealing member-side groove is longer than a length in a circumferential direction of a projection part projected toward the sealing member of the display region-side groove, and a part of the projection part projected toward the sealing member of the display region-side groove is arranged to come into a region surrounded by the projection part projected toward the sealing member of the sealing member-side groove.

In this configuration, the linear length of the line along the groove can be increased, and the width of the groove and protrusion part can be reduced.

In yet another embodiment, it may be arranged that at least one of the grooves is provided in a linear form along the circumferential direction.

In this configuration, by increasing the number of repetitions of the bent portions of the grooves of the wave-like shaped groove, the linear length of the line along the groove can be increased and the width in a plan view of the groove and protrusion part can be reduced.

In yet another embodiment, it may be arranged that the liquid crystal display apparatus further including an interlayer insulation film formed over the one substrate, the interlayer insulation film having a first groove, and a conductive film formed so as to cover the interlayer insulation film while maintaining a shape of the first groove, wherein the groove is formed by the conductive film provided on a surface of the first groove.

In this configuration, the grooves and protrusions can be formed on the conductive film at a position corresponding to the groove and protrusion of the interlayer insulation film, enabling to form the groove and protrusion part having the grooves with wave-like shape easily.

According to this arrangement, a linear length of the line along the groove, a surface area of the grooves and a surface tension of the liquid material for the alignment film can be increased due to the wave-like shape of the groove and protrusion part, preventing the wet-spreading of the liquid material and the entering of the alignment film to the sealing membrane forming region.

Therefore, the peeling of the sealing member caused by the deterioration of adhesion between the sealing member and a substrate can be suppressed. Furthermore, even when a size of an outer shape of the display panel is made to be smaller and the distance between the display region and the sealing member forming region becomes narrower, the wet-spreading of the liquid material for the alignment film is suppressed, enabling to attain a narrow frame of the display panel satisfactory.

Further, the groove and protrusion part does not include a cut portion, and therefore, the alignment film does not spread to the sealing member forming region from the cut portion.

DETAILED DESCRIPTION

The invention will be further described below in terms of several embodiments and particularly in terms of drawings showing some embodiments.

Embodiment 1

Figure 1:
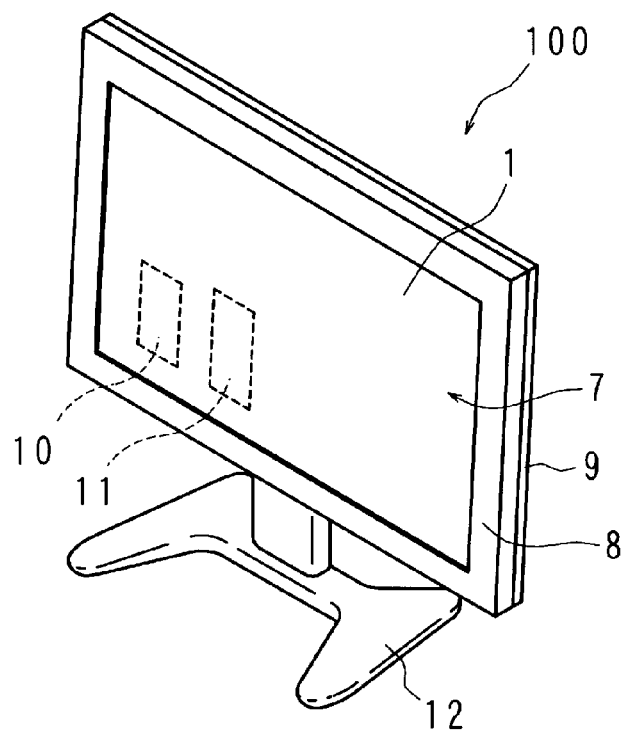
FIG. 1 is a schematic perspective view of a television receiver according to Embodiment 1.
Figure 2:
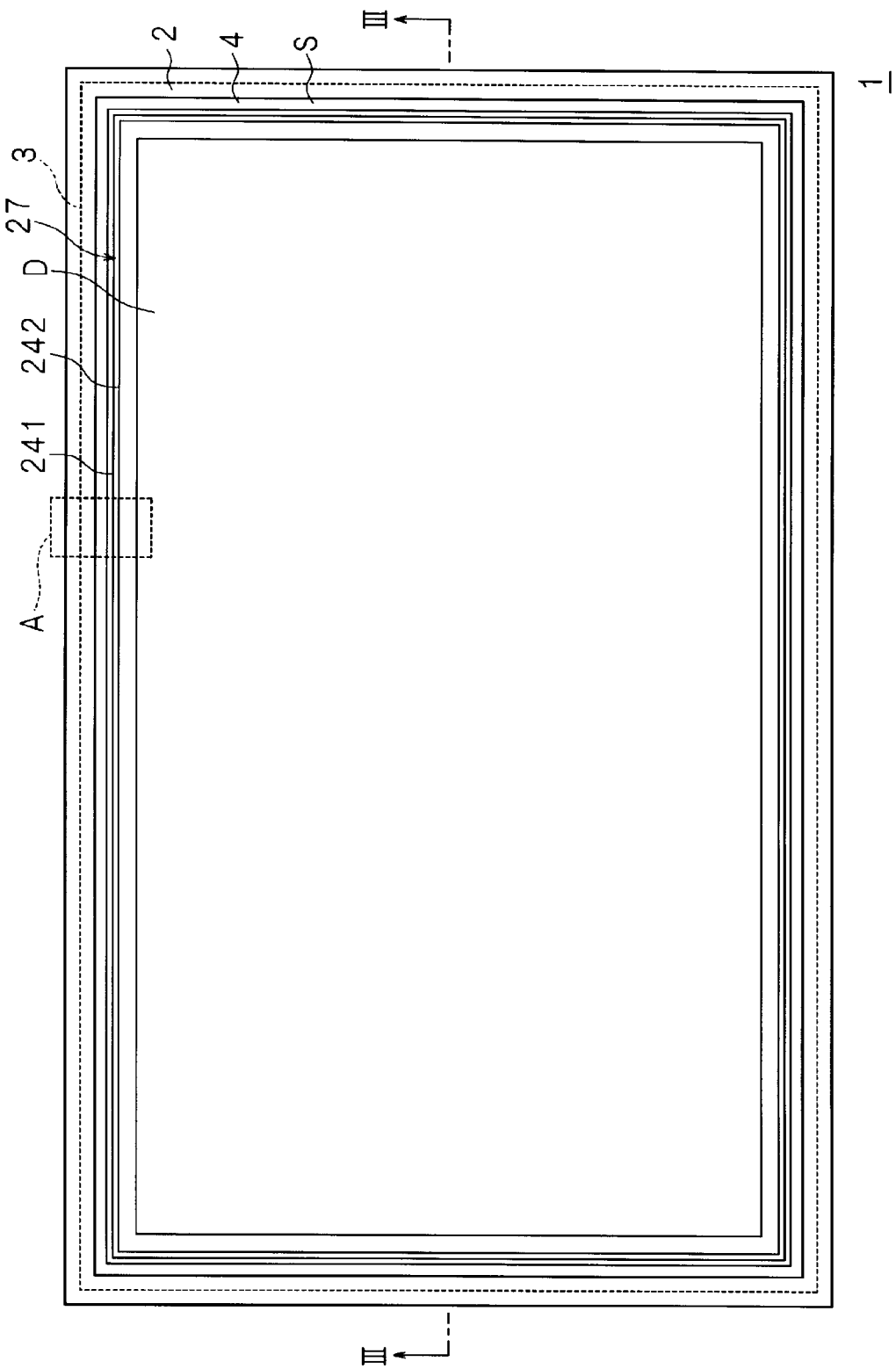
FIG. 2 is a schematic plan view of a display panel in a state that a CF substrate is detached.
Figure 3:
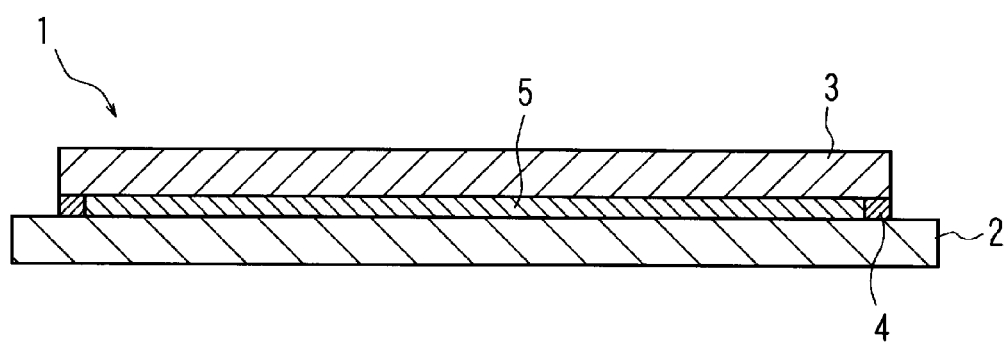
FIG. 3 is a cross sectional view along the line III-III of FIG. 2.
Figure 4:
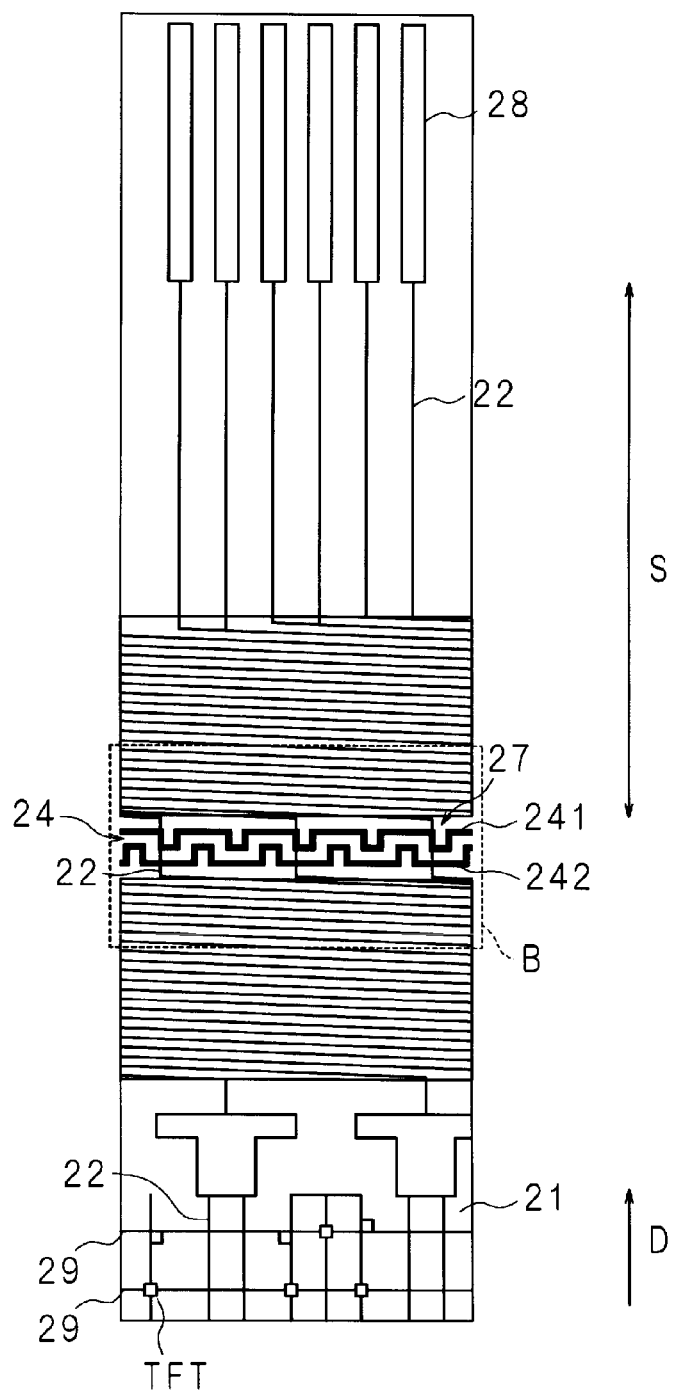
FIG. 4 is an enlarged view of the portion A of FIG. 2.
Figure 5:
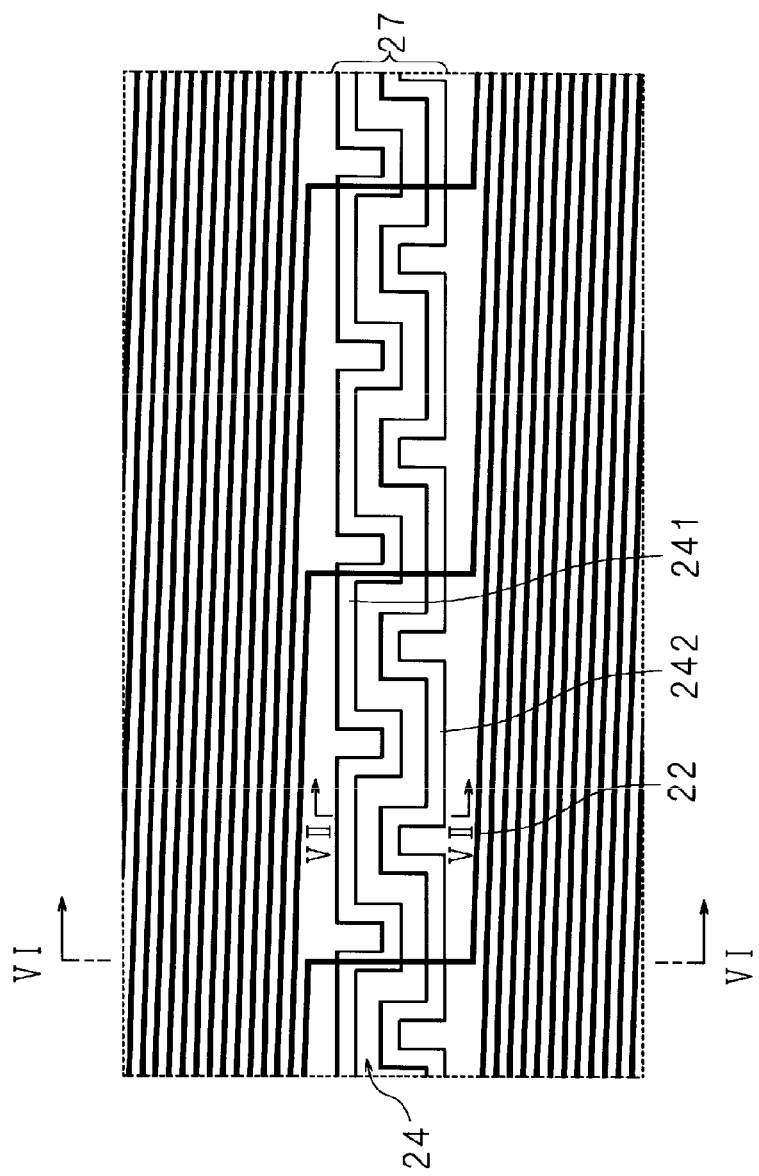
FIG. 5 is an enlarged view of the portion B of FIG. 2.
Figure 6:
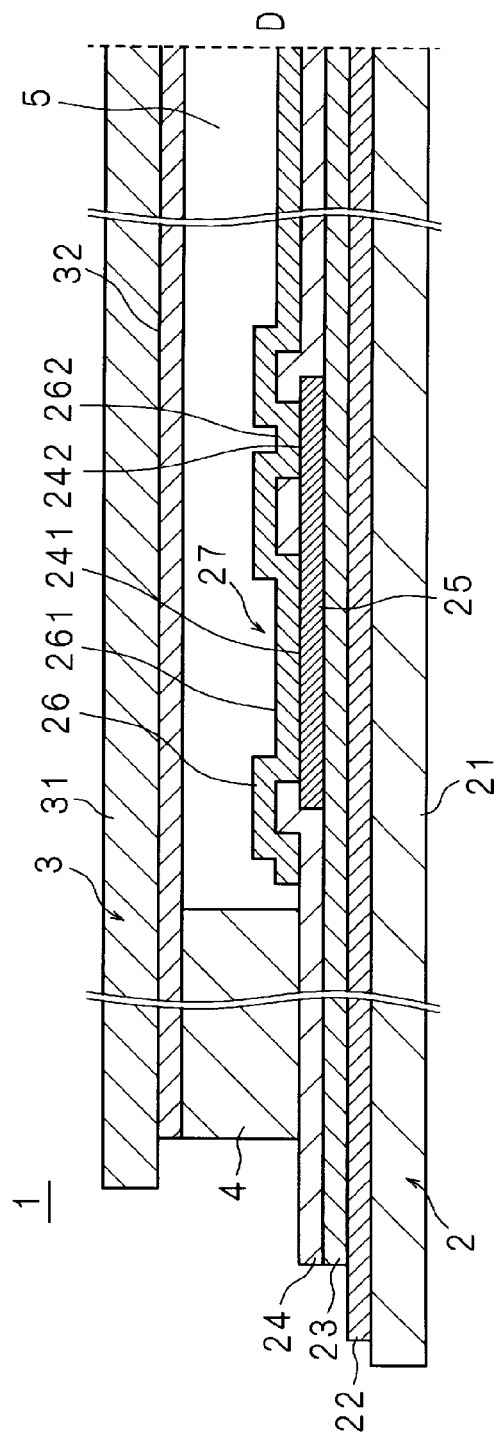
FIG. 6 is a cross-sectional view along the line VI-VI of FIG. 5.
Figure 7:
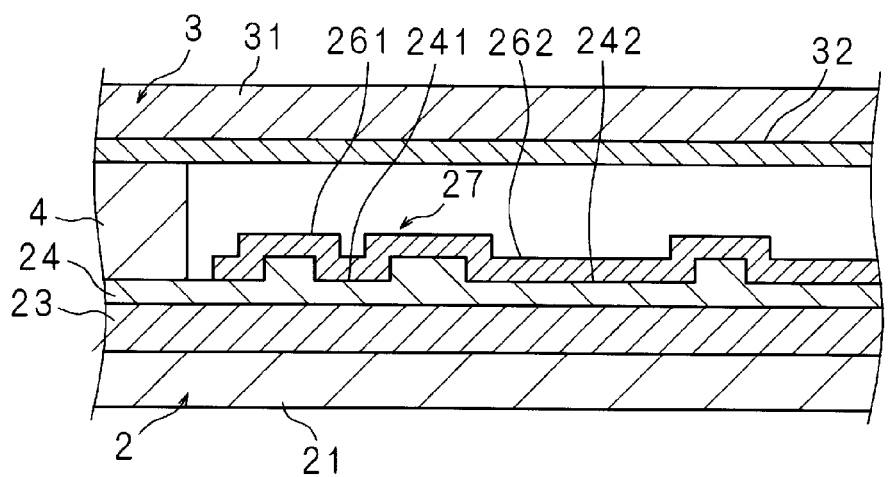
FIG. 7 is a cross-sectional view along the line VII-VII of FIG. 5.

FIG. 1 is a schematic perspective view showing a television receiver (hereinafter referred to as TV receiver) 100 according to Embodiment 1. FIG. 2 is a schematic plan view showing a display panel 1 in a state that a CF substrate 3 is detached. FIG. 3 is a cross sectional view along the line III-III of FIG. 2. FIG. 4 is an enlarged view of the portion A of FIG. 2. FIG. 5 is an enlarged view of the portion B of FIG. 2. FIG. 6 is a cross-sectional view along the line VI-VI of FIG. 5. FIG. 7 is a cross-sectional view along the line VII-VII of FIG. 5. The portion A is the portion corresponding to a part of the upper side of the display panel 1. It should be noted that an alignment film close to the CF substrate 3 is omitted in the figures. FIG. 2, FIG. 4 and FIG. 5 show a groove 241, 242 formed on a second interlayer insulation film 24 (a first groove) as a groove of a groove and protrusion part 27. In FIG. 4 and FIG. 5, a cover metal 25 and a conductive film 26 are omitted.

The TV receiver 100 includes a horizontally long display module 7 with the display panel 1 for displaying images, a front cabinet 8 and a rear cabinet 9 that are both made of synthetic resin configured to accommodate the display module 7 so as to sandwich the display module 7, a tuner 10 with which to receive a broadcast wave from an antenna (not shown), a decoder 11 with which to decode an encoded broadcast wave, and a stand 12. The display module 7 has a horizontally long, substantially rectangular parallelepiped shape as a whole and is housed vertically between the front cabinet 8 and the rear cabinet 9.

When the display module 7 is, for example, an edge-light type, it includes the display panel 1, optical sheets, for example, three of them (not shown, same for the following components), a light guiding plate, an LED substrate, a reflection sheet, and a chassis.

As shown in FIG. 2 and FIG. 3, the display panel 1 includes a TFT substrate 2 and a CF substrate 3 facing each other, a liquid crystal layer 5 provided between the TFT substrate 2 and the CF substrate 3 as a display medium layer, and a frame-shape sealing member 4 for bonding the TFT substrate 2 and the CF substrate 3 together at a periphery thereof and sealing the liquid crystal layer 5 into a space between the TFT substrate 2 and the CF substrate 3. In FIG. 2, the CF substrate 3 is shown in imaginary lines.

The planar area of the TFT substrate 2 is larger than that of the CF substrate 3.

The display region D to display a video or an image is formed in a region where the TFT substrate 2, the liquid crystal layer 5, and the CF substrate 3 are provided so as to overlap in a plan view, slightly inside a sealing member forming region S in which the sealing member 4 is formed. The groove and protrusion part 27 is provided in a frame shape by a groove 241 and a groove 242 that are arranged separately from one another between the sealing member 4 and the display region D.

An alignment film 6 (see FIG. 8) is formed so that the periphery of the film is disposed between the display region D and the groove and protrusion part 27.

As shown in FIG. 4, in the display region D, the TFT substrate 2 includes on an insulation substrate 21 such as a glass substrate a plurality of signal wirings 22 disposed side by side in the row direction, a plurality of gate wirings 29 disposed side by side in a direction crossing the signal wirings 22, which is, in the column direction, a plurality of TFTs each provided for each of the regions formed by crossing the signal wirings 22 and gate wirings 29, which is, pixel regions, a plurality of conductive films (pixel electrodes) 26 (see FIG. 6) arranged in a matrix and each connected to the respective TFTs, and an alignment film 6, which will be described in the following, arranged such that to cover the respective conductive films 26.

At the periphery of the display panel 1, a plurality of terminal parts 28 are arranged side by side in the row direction. The signal wirings 22 are arranged to extend linearly from the terminal parts 28 to the display region D at the outer side of the sealing member forming region S, while they are arranged to extend at a predetermined angle to the row direction at the inner side of the sealing member forming region S (the area closer to the display region D). The signal wirings 22 are arranged to cross across the groove and protrusion part 27, extend at a predetermined angle to the row direction at the outer side of the display region D (the area closer to the sealing member forming region S), and then extend in a perpendicular direction to the display region D.

As shown in FIG. 4 and FIG. 5, the groove 241 and the groove 242 of the second interlayer insulation film 24 are arranged so as to meander in a wave-like shape wherein the shape is a square wave shape. The grooves are arranged such that a linear length of the line along the groove of the part of the groove 241, provided close to the sealing member forming region S, that is projected toward the sealing member forming region S in a plan view and arranged in substantially parallel with the sealing member forming region S is longer than that of the part of the groove 242, provided close to the display region S in plan view, that is projected toward the sealing member forming region S in a plan view and arranged in substantially parallel with the sealing member forming region S, and a part of the projection part of the groove 242 that is projected toward the sealing member forming region S is partially inserted into the inside of a the projection part of the groove 241.

As shown in FIG. 6, the signal wirings 22 are formed on the insulation substrate 21, such as a glass substrate, of the TFT substrate 2 by depositing a metal film using, for example, sputtering and patterning the metal film.

On the signal wirings 22, a first interlayer insulation film 23 made of, for example, SiN$_x$ may be formed.

A cover metal 25 may be formed at a portion corresponding to the groove and protrusion part 27 on the first interlayer insulation film 23 and above the signal wirings 22.

The second interlayer insulation film 24 made of an organic insulation film such as photosensitive acrylic resin may be provided in such a way to cover the first interlayer insulation film 23, as shown in FIG. 6 and FIG. 7, and the cover metal 25, and the groove 241 and the groove 242 may be formed by patterning.

On the second interlayer insulation film 24, a conductive film 26 may be made from ITO. On the conductive film 26 the groove 261, 262 may be formed at a position corresponding to the groove 241, 242.

The conductive film 26 may configure a pixel electrode in the display region D.

On an insulation substrate 31, such as a glass substrate, of the CF substrate 3, a black matrix 32 and the color filters (not shown) such as R (red), G (green), and B (blue), may be arranged.

An alignment film 6 may be formed by, for example, an inkjet method using a material such as polyimide so as to cover a conductive film 26 as a pixel electrode with a planar area slightly larger than the display region D of the TFT substrate 2.

Figure 8:
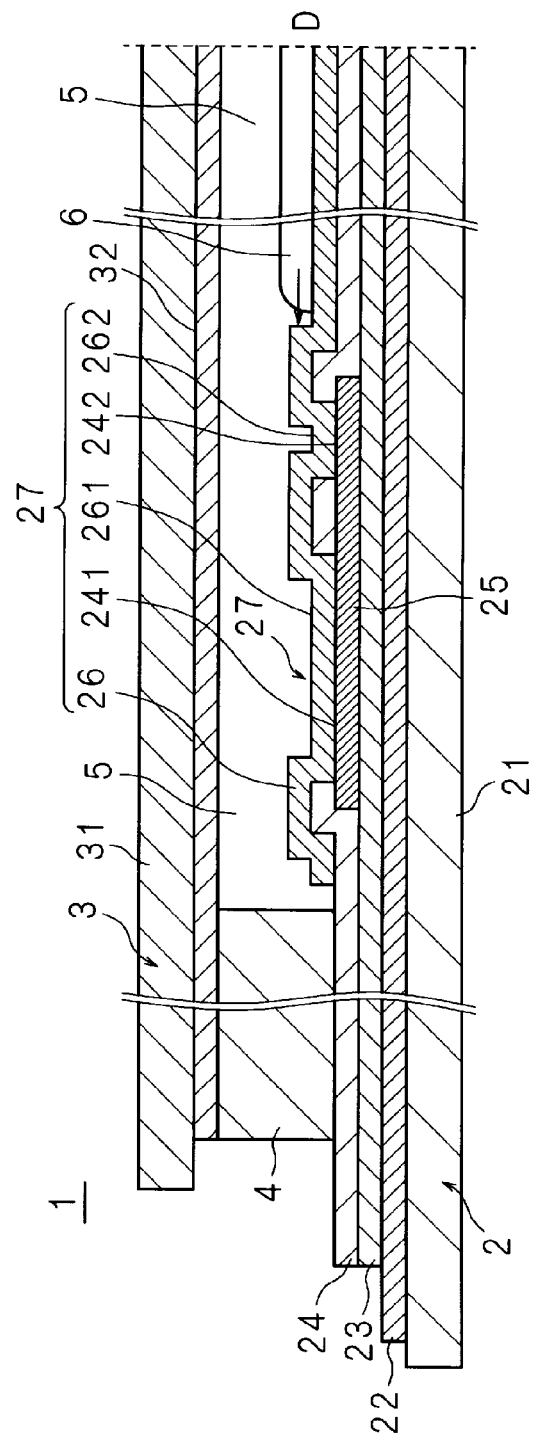
FIG. 8 is a schematic cross-sectional view of an alignment film formed on a conductive film.

FIG. 8 is a schematic cross-sectional view of an alignment film formed on the conductive film 26.

As mentioned above, the polyimide used as a liquid material for the alignment film 6 can easily wettingly spread.

In the presently illustrated embodiment, the groove 241, 242 of the second interlayer insulation film 24 at the groove and protrusion part 27 has a square wave shape in a plan view, the corresponding groove 261, 262 of the conductive film 26 also has a square wave shape in a plan view, a linear length of the line along the groove (a length of a side surface of the groove) of the groove 261, 262 is long and a surface areas of the grooves is large, resulting a large surface tension of the liquid material for the alignment film 6 at the groove and protrusion part 27. Therefore, the wet-spreading of the liquid material for the alignment film 6 to the sealing member forming region S can be excellently suppressed, and the entering of the alignment film 6 into the sealing member forming region S can be well prevented.

Thus the peeling of the sealing member 4 caused by the deterioration of adhesion between the sealing member 4 and the TFT substrate 2 can be suppressed.

In the presently illustrated embodiment, the groove 241, 242 has a square wave shape in a plan view, and the bent portion of the corresponding groove 261, 262 of the conductive film 26 forms a right angle, enabling a better prevention of the wet-spreading of the liquid material, compared to the configuration in which the bent portion of the groove constitutes a obtuse angle. A length in a circumferential direction of a projection part of the groove 241 is longer than a length in a circumferential direction of a projection part of the groove 242 and a part of the square-shaped projection part of the groove 242 is arranged to come partially into a projection part of the groove 241, this makes it possible to increase a linear length of the line along the groove of the groove and protrusion part 27 and reduce a width of the groove and protrusion part 27.

Furthermore, even when a size of an outer shape of the display panel 1 is made to be smaller and when the groove and protrusion part 27 and the sealing member forming region S are formed close to a periphery of the display region D, a coating margin for the alignment film 6 is decrease and the width of the groove and protrusion part 27 becomes narrower, the wet-spreading of the liquid material for the alignment film 6 is suppressed, enabling to attain a narrow frame of the display panel 1 excellently.

Further, the groove 241, 242 as well as the groove 261, 262 do not include a cut portion, and therefore, in contrast to the conventional technique described in Patent Document 1, the alignment film 6 does not spread to the sealing member forming region S starting from the cut portion.

It should be noted that, in the presently illustrated embodiment, a square-shaped wave in which the bending point of the groove 241 is located on the signal wirings 22 is set as shown in FIG. 4; however, it should be understood that there is no intent to limit the invention by such Examples. It will be appreciated that there would be no problem arisen if the signal wirings 22 are covered by the cover metal 25 and the conductive film 26.

Also, in the presently illustrated embodiment, the groove 241, 242 is arranged on the four sides of the display panel 1 so as to surround the periphery of the display region D; however, it should be understood that there is no intent to limit the invention by such Examples. The groove 241, 242 can be arranged only at the area through which the alignment film 6 could spread to the sealing member forming region S due to the short distance between the display region D and the sealing member forming region S.

Embodiment 2

A display panel according to Embodiment 2 has a configuration similar to that of the display panel 1 according to Embodiment 1 except that the planar shape of the groove of the second interlayer insulation film 24 is different from that of the groove of the second interlayer insulation film 24 of the display panel 1 according to Embodiment 1.

Figure 9:
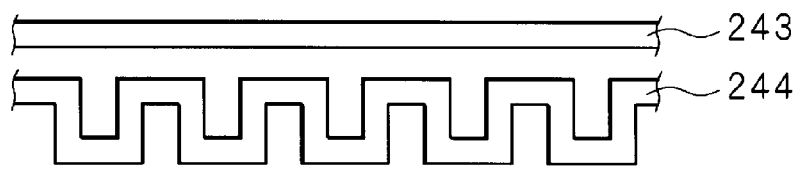
FIG. 9 is a schematic plan view of grooves of second interlayer insulation film according to Embodiment 2.

FIG. 9 is a schematic plan view of the groove 243, 244 of the second interlayer insulation film 24 according to Embodiment 2.

The groove 243 extends linearly.

The groove 244 is arranged so as to meander in a wave-like shape wherein the shape is a square wave shape, in the similar way to the groove 241 and the groove 242 according to Embodiment 1. The groove 244 is provided close to the display region D compared to the groove 243. The length of the projection part of the groove 244 is substantially same as the width of the projection part of the groove 242, the wave pitch of the groove 244 is shorter than that of the groove 242, and the length of a side surface of the groove is longer than that of the groove 242.

Therefore, when the alignment film 6 is formed after the formation of the conductive film 26 on the second interlayer insulation film 24, followed by the formation of the grooves corresponding to the groove 243, 244, this configuration can provide a significant effect through the configuration of the groove 244 in preventing the wet-spreading of the liquid material for the alignment film 6. Further, the width of the groove and protrusion part 27 can be made to be narrower.

Embodiment 3

A display panel according to Embodiment 3 has a configuration similar to that of the display panel 1 according to Embodiment 1 except that the planar shape of the groove of the second interlayer insulation film 24 is different from that of the groove of the second interlayer insulation film 24 of the display panel 1 according to Embodiment 1.

Figure 10:
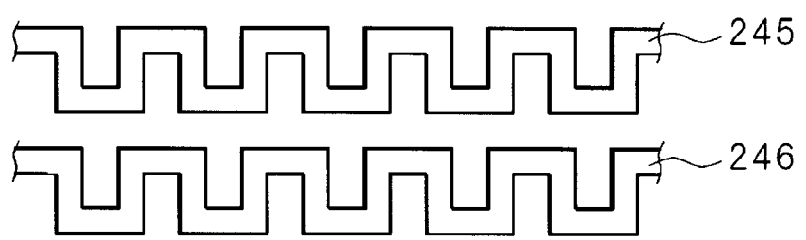
FIG. 10 is a schematic plan view of grooves of second interlayer insulation film according to Embodiment 3.

FIG. 10 is a schematic plan view of the groove 245, 246 of the second interlayer insulation film 24 according to Embodiment 3.

The groove 245, 246 is arranged so as to meander in a wave-like shape wherein the shape is a square wave shape, in the similar way to the groove 241 and the groove 242 according to Embodiment 1. The length of the projection part and wave pitch of the groove 245, 246 are substantially same as the length of the projection part and wave pitch of the groove 244 according to Embodiment 2, and, both the length of the projection part and the wave pitch are short, and the length of a side surface of the groove is long. Unlike Embodiment 2, this configuration includes two rows of the grooves, which are short in the length of the projection part and the wave pitch. Therefore, when the alignment film 6 is formed after the formation of the conductive film 26, followed by the formation of the grooves corresponding to the groove 245, 246, this can provide a significant effect in preventing the wet-spreading of the liquid material for the alignment film 6.

Embodiment 4

A display panel according to Embodiment 4 has a configuration similar to that of the display panel 1 according to Embodiment 1 except that the planar shape of the groove of the second interlayer insulation film 24 is different from that of the groove of the second interlayer insulation film 24 of the display panel 1 according to Embodiment 1.

Figure 11:
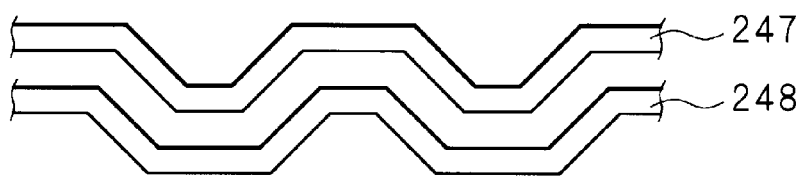
FIG. 11 is a plan view of grooves of second interlayer insulation film according to Embodiment 4.
Figure 12:
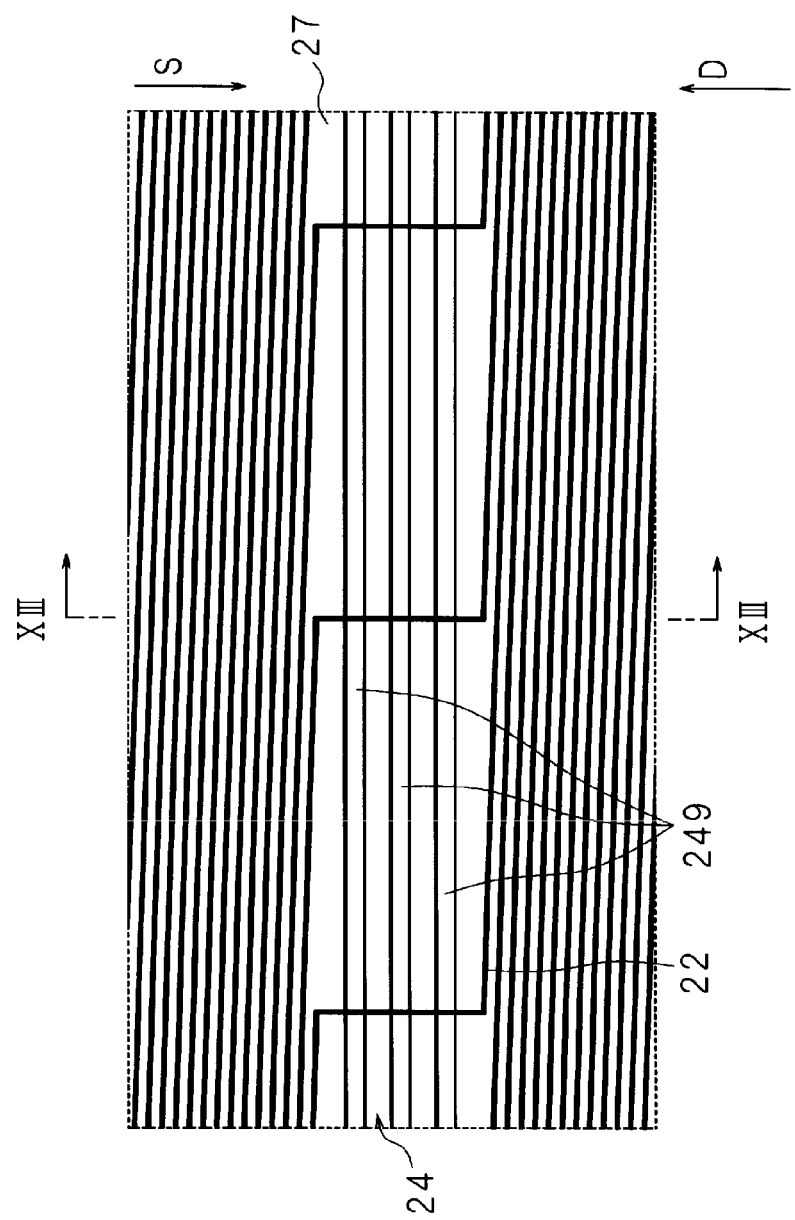
FIG. 12 is a schematic plan view of a groove and protrusion part of a display panel of a liquid crystal display apparatus of Patent Document 1.
Figure 13:
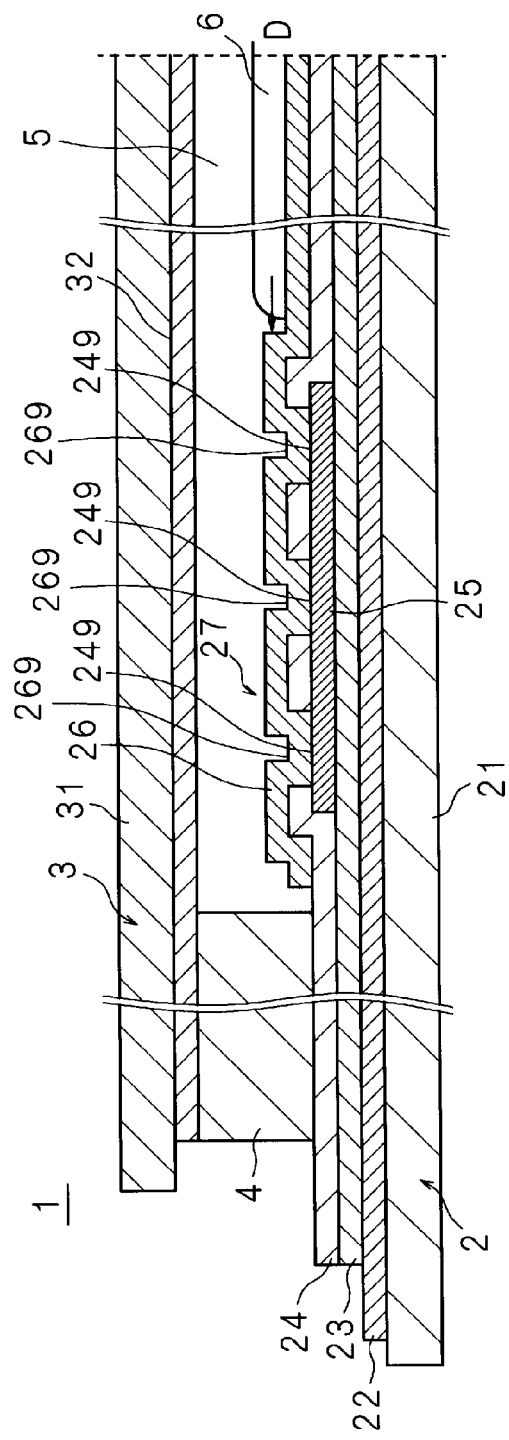
FIG. 13 is a cross sectional view along the line XIII-XIII of FIG. 12.

FIG. 11 is a plan view of the groove 247, 248 of the second interlayer insulation film 24 according to Embodiment 4.

The groove 247, 248 is arranged to have a sine wave shape or trapezoidal wave shape instead of the square wave shape of the grooves according to Embodiments 1 to 3.

Therefore an interference with other members is less likely to occur.

Further, in the presently illustrated embodiment, when the alignment film 6 is formed after the formation of the conductive film 26, followed by the formation of the grooves corresponding to the groove 247, 248, this configuration can provide a significant effect in preventing the wet-spreading of the liquid material for the alignment film 6.

Further, the linear length of the line along the groove of the outer portion of projection part of the groove 247 is longer than that of the outer portion of projection part of the groove 248 and a part of the outer portion of the groove 248 is arranged to come partially into the outer portion of projection part of the groove 247, this makes it possible to increase a linear length of the line along the groove of the groove and protrusion part 27 and reduce a width of the groove and protrusion part 27.

It should be appreciated that the disclosed Embodiments 1 to 4 are intended to be illustrative and not restrictive in all respects. The scope of the present invention is not limited to the above-described context, and the meaning equivalent to the claims and all modifications within the scope of the claims are intended to be included. Namely, embodiments that can be obtained by combining the technical means properly modified within the scope of the claims are also included in the technical scope of the present invention.

For example, the present invention is not to be limited to the configurations in which the bent portions of the wave-like shape grooves are arranged at equal intervals in the circumferential direction and to have the same length and same projecting height. The intervals, length, and projecting height of the bent portions may be changed at the regions through which the alignment film 6 could spread to the sealing member forming region S and the other regions in which such problems would hardly occur.

Further, the planar shapes of the grooves of the second interlayer insulating films 24 according to Embodiments 1 to 4 may be combined. For example, the configuration of Embodiment 4 may be adapted for the right and left sides of the display panel 1 and the configuration of Embodiment 1 may be adapted for the upper and lower sides of the display panel 1.

Further, it should be understood that the materials for the alignment film 6, the second interlayer insulation film 24, or the conductive film 26 are not particularly limited to the ones described in detail in the exemplary Embodiments 1 to 4.

Furthermore, the liquid crystal display apparatus is not limited to those provided in a TV receiver.

What is claimed is:

1. A liquid crystal display apparatus comprising:
   a first edge and a second edge that are each on a perimeter of the liquid crystal display apparatus, wherein the second edge is opposite of the first edge;
   two rectangular-shaped substrates bonded together with a sealing member formed at a periphery thereof;
   a liquid crystal layer provided at a region surrounded by the sealing member between the two substrates to form a display region;
   an alignment film provided at the display region on a surface of one substrate of the two substrates, the surface opposing to the other substrate of the two substrates; and
   a groove and protrusion part provided between the display region and the sealing member on the surface of the one substrate, wherein the groove and protrusion part comprises a first groove and a second groove, a depth of the first and second grooves is within a first dimension that corresponds with a spacing between the two substrates, and each of the first groove and the second groove has a wave-like shape in a plan view as viewed from a vertical direction of the surface of the one substrate; and wherein each of the first groove and the second groove alternately comprises a first projection part and a second projection part;

wherein each first projection part in a first length segment of the groove and protrusion part protrudes in a direction of the first edge and away from the display region and each second projection part in the first length segment of the groove and protrusion part protrudes in a direction of the second edge and toward the display region, and wherein a width of the first projection part of the first groove is larger than a width of the first projection part of the second groove, and each first projection part of the second groove in the first length segment protrudes in a direction of a concave interior of a corresponding first projection part of the first groove.

2. The liquid crystal display apparatus of claim 1, wherein the wave-like shape in a plan view of each of the first groove and the second groove is a rectangular wave shape.

3. The liquid crystal display apparatus of claim 1, wherein the wave-like shape in a plan view of each of the first groove and the second groove is a sine wave shape or trapezoidal wave shape.

4. The liquid crystal display apparatus of claim 1, further comprising:

an interlayer insulation film formed over the one substrate, the interlayer insulation film having third grooves, and a conductive film formed so as to cover the interlayer insulation film while maintaining a shape of the third grooves, wherein the first groove and the second groove are formed by the conductive film provided on a surface of the third grooves.

5. The liquid crystal display apparatus of claim 1, wherein each first projection part of each of the first and second grooves protrudes in a direction that is both toward a corresponding portion of the sealing member and away from the display region, and each second projection part of each of the first and second grooves protrudes in a direction that is both away from a corresponding portion of the sealing member and toward the display region.

6. The liquid crystal display apparatus of claim 1, wherein the first groove in the first length segment is located between the first edge and the second groove in the first length segment.

7. The liquid crystal display apparatus of claim 1, wherein the first edge is a top edge of the liquid crystal display apparatus and the second edge is a bottom edge of the liquid crystal display apparatus.

8. The liquid crystal display apparatus of claim 1, wherein the first length segment comprises a plurality of first projection parts and a plurality of second projection parts for each of the first groove and the second groove.

9. The liquid crystal display apparatus of claim 8, further comprising:

a third edge and a fourth edge that are each on the perimeter of the liquid crystal display apparatus, wherein the fourth edge is opposite of the third edge, each of the third edge and the fourth edge extend between the first edge and the second edge, each first projection part of the first groove in the first length segment is at a different spacing from each of the third and fourth edges compared to every other first projection part of the first groove in the first length segment, and each first projection part of the second groove in the first length segment is at a different spacing from each of the third and fourth edges compared to every other first projection part of the second groove in the first length segment.

10. The liquid crystal display apparatus of claim 9, wherein each first projection part of each of the first and second grooves includes first and second sides that are spaced from one another to define the corresponding width dimension, and the first side of each first projection part of each of the first and second grooves is closer to the third edge than its corresponding second side.

11. The liquid crystal display apparatus of claim 1, wherein each first projection part of each of the first and second grooves includes a pair of sides that are spaced from one another to define the corresponding width dimension.

12. The liquid crystal display apparatus of claim 1, wherein each first projection part of the second groove in the first length segment protrudes into the concave interior of the corresponding first projection part of the first groove.

13. The liquid crystal display apparatus of claim 1, wherein a width of the second projection part of the second groove is larger than a width of the second projection part of the first groove and each second projection part of the first groove in the first length segment protrudes in a direction of a concave interior of a corresponding second projection part of the second groove.

14. The liquid crystal display apparatus of claim 13, wherein each second projection part of the first groove in the first length segment protrudes into the concave interior of the corresponding second projection part of the second groove.

15. The liquid crystal display apparatus of claim 13, wherein each second projection part of each of the first and second grooves includes a pair of sides that are spaced from one another to define the corresponding width dimension.

* * * * *